United States Patent
Moeskjaer

(10) Patent No.: US 10,851,840 B2
(45) Date of Patent: Dec. 1, 2020

(54) ROTOR BEARING WITH A MAGNETICALLY COUPLED BEARING COVER

(71) Applicant: SIEMENS GAMESA RENEWABLE ENERGY A/S, Brande (DK)

(72) Inventor: Martin Moeskjaer, Orlando, FL (US)

(*) Notice: Subject to any disclaimer, the term of this patent is extended or adjusted under 35 U.S.C. 154(b) by 0 days.

(21) Appl. No.: 16/481,505

(22) PCT Filed: Dec. 6, 2017

(86) PCT No.: PCT/EP2017/081741
§ 371 (c)(1),
(2) Date: Jul. 29, 2019

(87) PCT Pub. No.: WO2018/141442
PCT Pub. Date: Aug. 9, 2018

(65) Prior Publication Data
US 2019/0383328 A1    Dec. 19, 2019

(30) Foreign Application Priority Data

Jan. 31, 2017 (DE) .................. 10 2017 101 849

(51) Int. Cl.
*F16C 35/067* (2006.01)
*F16C 33/78* (2006.01)
(Continued)

(52) U.S. Cl.
CPC .......... *F16C 33/7886* (2013.01); *F03D 80/70* (2016.05); *F03D 80/80* (2016.05);
(Continued)

(58) Field of Classification Search
CPC ................ F16C 33/723; F16C 33/7806; F16C 33/7886; F16C 2226/18; F16C 2360/31;
(Continued)

(56) References Cited

U.S. PATENT DOCUMENTS

2010/0119183 A1    5/2010    Winzen
2011/0213600 A1*   9/2011    Strebelle ............... G01V 1/50
                                                              703/10
(Continued)

FOREIGN PATENT DOCUMENTS

CN    102213264 A    10/2011
CN    203202045 U    9/2013
(Continued)

OTHER PUBLICATIONS

International Search Report and Written Opinion for PCT/EP2017/081741.
(Continued)

*Primary Examiner* — Phillip A Johnson
(74) *Attorney, Agent, or Firm* — Schmeiser, Olsen & Watts LLP

(57) ABSTRACT

A support structure associated with a nacelle of a wind turbine, wherein the support structure includes a bearing having an outer ring and an inner ring is provided. The bearing is surrounded by a bearing housing and a bearing cover. The bearing cover is coupled to the bearing magnetically. In some embodiments, the bearing cover may be coupled to the outer ring of the bearing by bolting. The thickness of the outer ring of the bearing may be increased to accommodate one or more protrusions. The protrusions are composed of a magnetic material and configured to receive a bearing cover.

12 Claims, 2 Drawing Sheets

Figure 1:
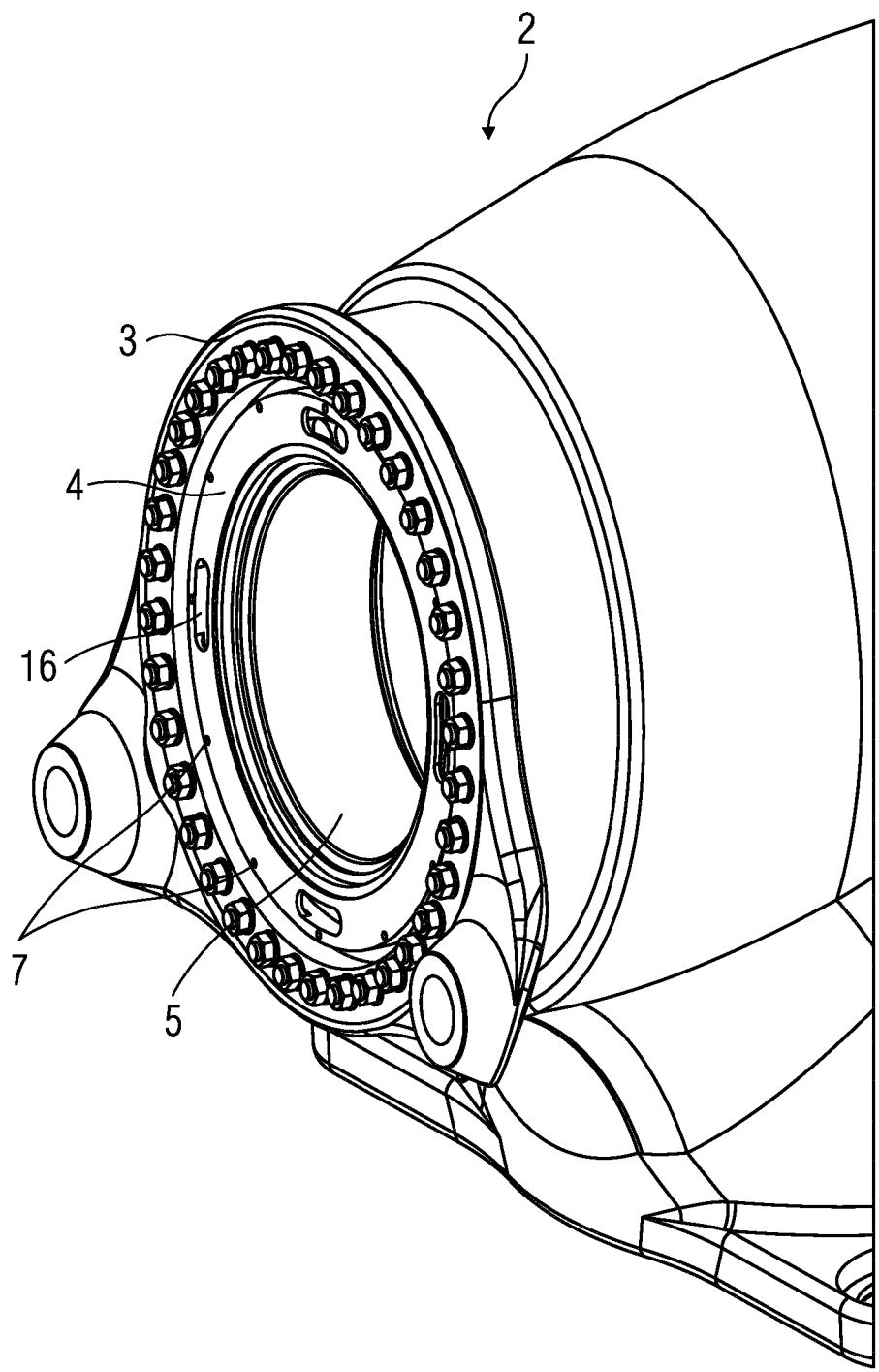

(51) Int. Cl.
   *F03D 80/70* (2016.01)
   *F03D 80/80* (2016.01)
   *F16C 19/38* (2006.01)

(52) U.S. Cl.
   CPC .......... *F16C 19/38* (2013.01); *F05B 2240/50* (2013.01); *F16C 33/7806* (2013.01); *F16C 2226/18* (2013.01); *F16C 2360/31* (2013.01)

(58) Field of Classification Search
   CPC ...... F16C 35/067; F16C 35/077; F03D 80/70; F05B 2240/50; F05B 2240/52; F05B 2240/54
   See application file for complete search history.

(56) References Cited

U.S. PATENT DOCUMENTS

| | | |
|---|---|---|
| 2011/0243741 A1 | 10/2011 | Eriksen |
| 2013/0156355 A1 | 6/2013 | Levsen |
| 2016/0115943 A1 | 4/2016 | Li et al. |
| 2016/0377061 A9 | 12/2016 | Smith |

FOREIGN PATENT DOCUMENTS

| | | |
|---|---|---|
| CN | 203702884 U | 7/2014 |
| DE | 102012221255 | 5/2014 |
| DE | 102012221255 A1 | 5/2014 |
| EP | 2187075 | 5/2010 |
| EP | 2187075 A1 | 5/2010 |
| EP | 2597301 A3 | 3/2014 |
| WO | 2012038327 A1 | 3/2012 |

OTHER PUBLICATIONS

ISA/EPO; International Search Report for corresponding International Application PCT/EP2017/081741 dated Mar. 26, 2018.
Non-English Chinese Office Action dated May 7, 2020 for Application No. 201780085299.7.

\* cited by examiner ered by reference.

ROTOR BEARING WITH A MAGNETICALLY COUPLED BEARING COVER

CROSS-REFERENCE TO RELATED APPLICATIONS

This application claims priority to PCT Application No. PCT/EP2017/081741, having a filing date of Dec. 6, 2017, which is based on German Application No. 10 2017 101 849.2, having a filing date of Jan. 31, 2017, the entire contents both of which are hereby incorporated by reference.

FIELD OF TECHNOLOGY

The following relates to a wind turbine assembly. More particularly, the following relates to a sealing element to seal the bearing component of the wind turbine.

BACKGROUND

Bearing end covers are used prevent foreign particles from entering the bearing assembly. Traditionally, bearing covers are made from steel or cast iron and bolted to a bearing housing. Affixing bearing covers using nuts and bolts pose a limitation to the design possibilities of a cover pate and the bearing housing of the wind turbine.

Further, close proximity of the bearing cover to the main bearing of the wind turbine demands cleanliness of the bearing cover. The material of the bearing cover is also a major factor as damage to the bearing cover can result in fragments of the bearing cover getting stuck in the main bearing. Various design improvements have been attempted to reduce the stress issues, to reduce the number of bolts and the like. So far, none of the existing solutions have addressed these shortcomings.

Therefore, there is a need for a bearing cover which can be affixed without the need for bolting to the bearing housing. Further, there is a need for a bearing cover which can be coupled very close to the bearing so that foreign particles do not enter the bearing. Furthermore, there is a need for making the bearing cover lighter and easier to fabricate.

SUMMARY

An aspect relates to a support structure associated with a nacelle of a wind turbine, wherein the support structure comprises a bearing having an outer ring and an inner ring. The bearing is surrounded by a bearing housing and a bearing cover. The bearing cover is coupled to the bearing using magnetic means. In some embodiments, the bearing cover may be coupled to the outer ring of the bearing using bolting means. The thickness of the outer ring of the bearing may be increased to accommodate one or more protrusions. The protrusions are composed of a magnetic material and configured to receive a bearing cover.

In another aspect of embodiments of the invention, the outer ring of the bearing comprises a plurality of protrusions with a magnetic material. The outer ring of the bearing is extended beyond the normal level to accommodate the protrusions to which a bearing cover may be coupled. In an embodiment, the protrusions may be welded on to the outer ring of the bearing. In some cases, the outer ring may be machined such that the outer ring is a part of the original structure of the outer ring of the bearing.

In another aspect of embodiments of the invention, the inner ring of the bearing comprises a plurality of protrusions with a magnetic material. The inner ring is adapted to receive the plurality of points of the bearing cover in order to provide protection to the bearing.

In yet another aspect of embodiments of the invention, the bearing cover comprises a plurality of points corresponding to the positions of the plurality of protrusions on outer ring. The points are composed of material configured to attach firmly with the plurality of protrusions on the inner ring of the bearing. The bearing cover may be designed such that the plurality of points on the bearing cover are coupled to the plurality protrusions.

In yet another aspect of embodiments of the invention, the bearing cover is adapted to cover the bearing opening between the outer ring and the inner ring. The bearing cover is adapted to couple to the plurality of protrusions in the outer ring of the bearing through magnetic means. The plurality of points on the bearing cover comprise a material which couples tightly with the magnetic material present in the plurality of protrusions. The bearing cover is designed such that it covers the exposed portions of the outer and inner rings.

In still yet another aspect of embodiments of the invention, a surface of the outer ring comprises a magnetic material. The magnetic material may be present at the tip of the plurality of protrusions. In another embodiment, the plurality of protrusions may be entirely composed of magnetic material.

In a further aspect of embodiments of the invention, the bearing cover is configured to attach firmly to the magnetic material on the surface of the outer ring. The plurality of points on the bearing cover couples with the plurality of the protrusions in a position firmly near the bearing.

In still yet another aspect, the bearing cover comprises a plurality of openings. The openings are provided for maintenance purposes. For instance, the bearing may be greased through the opening which is provided in the bearing cover.

In another aspect of embodiments of the invention, the bearing cover is composed at least one of an alloy and plastic based material. For instance, the bearing cover may be composed of a plastic material which may be light in weight and inexpensive. Further, fabrication of plastic parts may be performed with high accuracy which enables better protection for the bearing.

The above mentioned and other features of embodiments of the invention will now be addressed with reference to the accompanying drawings of the present invention. The illustrated embodiments are intended to illustrate, but not limit the invention.

BRIEF DESCRIPTION

Figure 2:
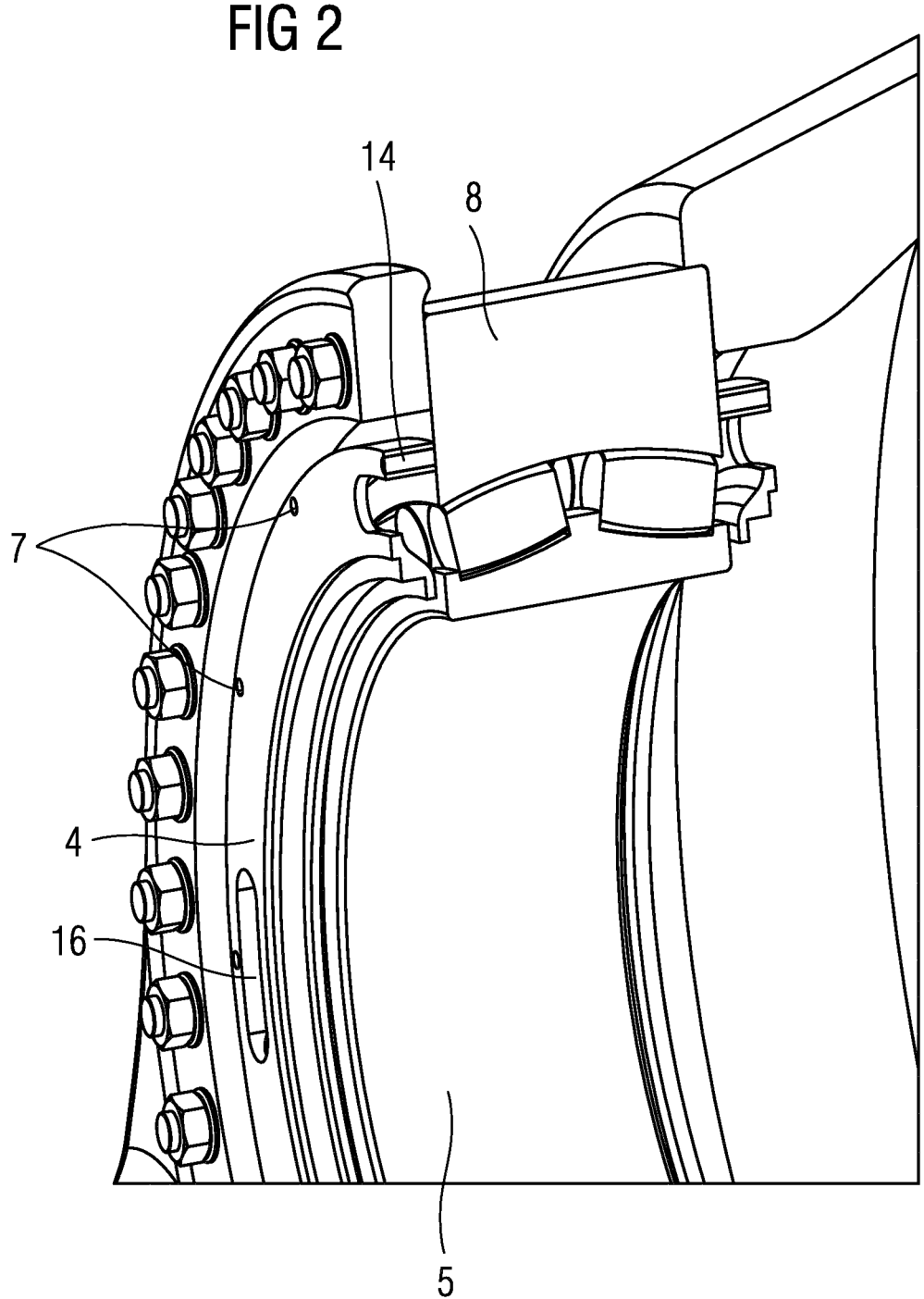

Some of the embodiments will be described in detail, with references to the following Figures, wherein like designations denote like members, wherein:

FIG. 1 illustrates a perspective view of a support structure associated with a nacelle of a wind turbine with a magnetically coupled bearing cover, in accordance with an embodiment; and FIG. 2 illustrates a cross sectional view of the support structure associated with the nacelle of the wind turbine with the magnetically coupled bearing cover, in accordance with an embodiment.

DETAILED DESCRIPTION

Various embodiments are described with reference to the drawings, wherein like reference numerals are used to refer like segments throughout. In the following description, for the purpose of explanation, numerous specific details are set forth in order to provide thorough understanding of one or more embodiments. It may be evident that such embodiments may be practiced without these specific details.

FIG. 1 illustrates a perspective view of a support structure associated with a nacelle of a wind turbine with a magnetically coupled bearing cover, in accordance with an embodiment. The support structure includes a casing 2. A bearing assembly is coupled to the casing 2 as illustrated in FIG. 2. Further, the bearing assembly is surrounded by a bearing housing 3 which aids in holding the bearing assembly in a predefined position. The bearing assembly includes an inner ring 5 and an outer ring 8. In between the inner ring 5 and the outer ring 8 there is a rotor arrangement. Further, the support structure includes a bearing cover 4 which is coupled to the outer ring 8 of the bearing of the bearing assembly.

In an embodiment, the bearing cover 4 may be coupled to the outer ring 8 of the bearing assembly using a magnetic means or a magnet. For example, the outer ring may include a plurality of protrusions 14 with a magnetic material. In an instance, the tip of the plurality of protrusions 14 may be composed of a magnetic material in order to receive the bearing cover 4. In another instance, the plurality of protrusions 14 may be composed entirely of a magnetic material. Further, the bearing cover 4 may include plurality point 7 on the inner surface of the bearing cover 4 composed of a material which is configured to attach to a magnetic material. In an instance, the plurality of points may be positioned corresponding to the plurality of protrusions 14 on the outer ring 8. Further, the thickness of the outer ring 8 may be increased to affix the plurality of protrusions 14.

In an embodiment, the plurality of protrusions 14 may be welded onto the outer ring 8. The plurality of protrusions 14 may be composed entirely of a magnetic material. In another example, the plurality of protrusions 14 may be machined from the material used to fabricate the outer ring 8. In this case, a magnetic material may be combined at the tip of the plurality of protrusions as shown in FIG. 2. Thereafter, the bearing cover 4 may be coupled to the plurality of protrusions 14.

FIG. 2 illustrates a cross sectional view of the support structure associated with the nacelle of a wind turbine with the magnetically coupled bearing cover, in accordance with an embodiment. FIG. 2 illustrates the outer ring 8, inner ring 5, bearing cover 4, protrusions 14, plurality of points 7, bearing housing 3 and roller assembly 9. It can be observed in FIG. 2, that the thickness of the outer ring 8 is increased. FIG. 2 illustrates one such protrusion of the plurality of protrusions 14. It can be observed that the protrusion 14 is composed of the same material as that of the outer ring 8. Further, the tip of the protrusion 14 has a magnetic material. The magnetic material aids in firmly coupling the bearing cover 4 to the outer ring 8 of the bearing assembly. In some embodiments, the plurality of protrusions 14 may be entirely composed of magnetic material. In such a case, the plurality of protrusions may be welded onto the outer ring 8 of the bearing assembly.

Further, the bearing cover 4 comprises a plurality of openings 16. The openings 16 may be used for maintenance of the bearing. For example, the openings 16 may be used to apply greasing agents to the bearing assembly. Further, the bearing cover 4 may be composed at least one of an alloy and plastic based material. For example, the bearing cover 4 may be composed of plastic material. The plastic bearing cover may result in reduced fabrication costs and replacement costs. Further, a bearing cover made of plastic may have better fitting with the bearing than that of a metal bearing cover.

The advantageous embodiments disclosed herein enable a cost-effective fabrication of bearing cover 4 for wind turbines. Since the bearing cover 4 is coupled to the bearing using magnets, there is no requirement of fastening the bearing cover to the bearing using nuts and bolts. As a result, the size of the bearing cover may be reduced. In the aforementioned embodiments, the bearing can be mounted directly onto the bearing. This arrangement may result in reduction of fretting particles from entering the bearing as the bearing cover 4 is coupled directly to the outer ring of the bearing. Further, the bearing cover 4 as described herein is easy to assemble and maintain.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

I claim:

1. A support structure of a nacelle associated with a wind turbine, wherein the support structure comprises:
   a bearing assembly having an outer ring and an inner ring, a bearing housing and a bearing cover, wherein:
   the bearing cover is coupled to the outer ring magnetically.

2. The support structure in accordance with claim 1, wherein the outer ring of the bearing comprises a plurality of protrusions with a magnetic material.

3. The support structure in accordance with claim 1, wherein the inner ring of the bearing comprises a plurality of protrusions with a magnetic material.

4. The support structure in accordance with claim 1, wherein the bearing cover includes a plurality of points corresponding to the positions of the plurality of protrusions on the outer ring, wherein the plurality of points are composed of material configured to attach with the plurality of protrusions.

5. The support structure in accordance with claim 1, wherein the bearing cover is adapted to cover the bearing assembly between the outer ring and the inner ring.

6. The support structure in accordance with claim 1, wherein a surface of the outer ring comprises a magnetic material.

7. The support structure in accordance with claim 1, wherein the bearing cover is configured to attach to the magnetic material on the surface of the outer ring.

8. The support structure in accordance with claim 1, wherein the bearing cover comprises a plurality of openings.

9. The support structure in according to claim 1, wherein the bearing cover is composed at least one of an alloy and a plastic based material.

10. A bearing cover for use in a bearing assembly associated with a wind turbine, wherein the bearing assembly comprises an outer ring and an inner ring, a bearing housing and a bearing cover, wherein:
    the bearing cover is coupled to the outer ring magnetically.

11. The bearing cover in accordance with claim 10, wherein the outer ring of the bearing comprises a plurality of protrusions with a magnetic material.

12. The bearing cover in accordance with claim 10, wherein the bearing cover includes a plurality of points corresponding to the positions of the plurality of protrusions on the outer ring, wherein the plurality of points are composed of material configured to attach with the plurality of protrusions.

* * * * *